US009950625B2

(12) United States Patent
Ueo

(10) Patent No.: US 9,950,625 B2
(45) Date of Patent: Apr. 24, 2018

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Daisuke Ueo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/304,906

(22) PCT Filed: Apr. 10, 2015

(86) PCT No.: PCT/IB2015/000462
§ 371 (c)(1),
(2) Date: Oct. 18, 2016

(87) PCT Pub. No.: WO2015/162471
PCT Pub. Date: Oct. 29, 2015

(65) Prior Publication Data
US 2017/0190255 A1    Jul. 6, 2017

(30) Foreign Application Priority Data
Apr. 22, 2014    (JP) .................. 2014-088099

(51) Int. Cl.
*B60L 1/00*    (2006.01)
*B60L 3/00*    (2006.01)
(52) U.S. Cl.
CPC ............. *B60L 3/0092* (2013.01); *B60L 1/006* (2013.01); *B60L 2210/40* (2013.01); *B60L 2240/40* (2013.01)

(58) Field of Classification Search
CPC .................................................. B60L 3/0092
USPC ........ 180/65.21; 903/903; 307/10.1; 701/22, 701/36
See application file for complete search history.

(56) References Cited

U.S. PATENT DOCUMENTS 8,600,593 B2 * 12/2013 Ohno ............... H01M 10/44
701/22
2005/0233189 A1 * 10/2005 Shioya ............... H01M 8/04
429/513

(Continued)

FOREIGN PATENT DOCUMENTS

EP    2799276 A1    11/2014
JP    2000-234539 A    8/2000
(Continued)

*Primary Examiner* — Cuong H Nguyen
(74) *Attorney, Agent, or Firm* — Oliff PLC

(57) ABSTRACT

A vehicle which a predetermined mode of the vehicle can be selected by a user. The vehicle including an electric power supply, a socket, an input device, and an electronic control unit. The input device is configured to receive, from the user, a selection indication to select an external supply mode. The external supply mode is a mode corresponding to a case where a position of the electrical device is outside the vehicle. The electrical device is configured to receive electric power from the electric power supply via the socket. The electronic control unit is configured to control the vehicle such that traveling of the vehicle is in a suppressed state when the external supply mode is selected by receiving the selection indication.

7 Claims, 9 Drawing Sheets

(56) References Cited

U.S. PATENT DOCUMENTS

| | | | |
|---|---|---|---|
| 2010/0168945 A1* | 7/2010 | Ohno | H01M 10/44 701/22 |
| 2013/0066552 A1* | 3/2013 | Hamilton, II | G06Q 10/047 701/527 |
| 2013/0261861 A1 | 10/2013 | Saito et al. | |
| 2015/0042160 A1* | 2/2015 | Matsuda | B62K 11/04 307/10.3 |

FOREIGN PATENT DOCUMENTS

| | | | | |
|---|---|---|---|---|
| JP | 2013-207860 A | | 10/2013 | |
| JP | 2013-233021 A | | 11/2013 | |
| JP | 02016096629 A | * | 5/2016 | B60L 11/02 |
| WO | WO2009/004920 | * | 1/2009 | H01M 10/44 |
| WO | WO2011/016135 | * | 2/2011 | B60L 3/003 |
| WO | 2013/098903 A1 | | 7/2013 | |

* cited by examiner

F I G. 4
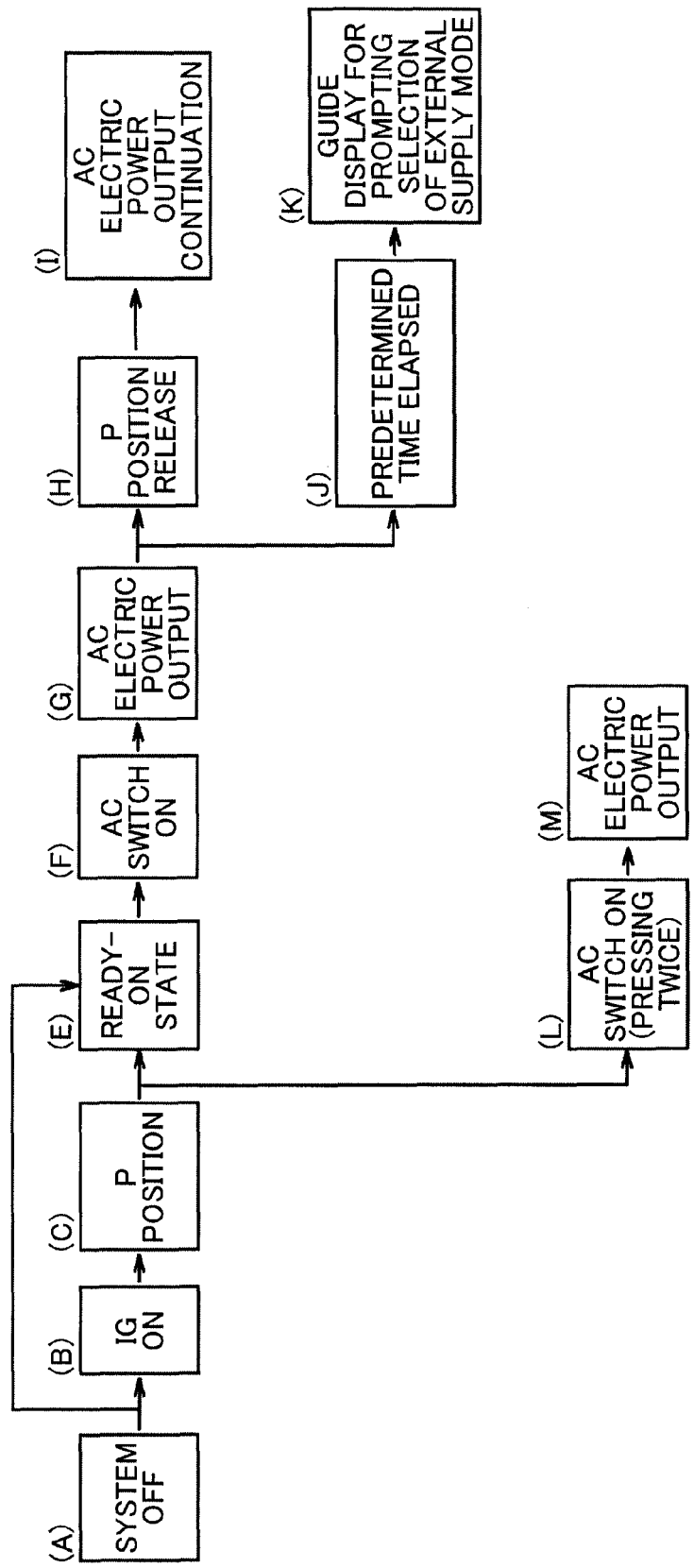

VEHICLE AND CONTROL METHOD FOR VEHICLE

BACKGROUND OF THE INVENTION

1. Field of the Invention

The present invention relates to a vehicle in which electric power can be supplied from an electric power supply mounted on the vehicle to an electrical device other than an device that is disposed in the vehicle, and a control method for a vehicle.

2. Description of Related Art

Japanese Patent Application Publication No. 2013-207860 (JP 2013-207860 A) discloses a technique for suppressing traveling of a vehicle in a case where pinching of an electric power supply cable of an electrical device by a door is detected during, for example, the supply of electric power to the electrical device outside the vehicle which is connected to a socket in a passenger compartment.

In the vehicle that is disclosed in JP 2013-207860 A described above, an additional detection device that detects the electric power supply cable which is pinched by the door is required, and the pinching of the electric power supply cable by the door cannot be detected unless the electric power supply cable of the electrical device is pinched by the door at a predetermined position. Accordingly, it may be impossible to appropriately suppress the traveling of the vehicle in a case where, for example, a window and the door of the vehicle are open and the electric power supply cable is allowed to pass therethrough.

SUMMARY OF THE INVENTION

The present invention provides a vehicle whose traveling is appropriately suppressed in a case where electric power is supplied from an electric power supply mounted on the vehicle to an electrical device disposed outside the vehicle, and a control method for a vehicle.

A vehicle related to the present invention is a vehicle which a predetermined mode of the vehicle can be selected by a user. The vehicle comprises an electric power supply, a socket, an input device, and an electronic control unit. The socket is connected to the electric power supply. The socket is configured to be connectable to a plug of an electrical device other than a device disposed in the vehicle. The input device is configured to receive, from the user, a selection indication for selecting an external supply mode. The external supply mode is a mode corresponding to a case where a position of the electrical device is outside the vehicle. The electrical device is configured to receive electric power from the electric power supply via the socket. The electronic control unit is configured to control the vehicle such that traveling of the vehicle is in a suppressed state when the external supply mode is selected by receiving the selection indication.

In this case, the traveling of the vehicle is in the suppressed state when the external supply mode is selected by receiving the selection indication of the user. Accordingly, a state where the vehicle is stopped can be maintained in a case where the position of the electrical device that receives the supply of the electric power from the electric power supply is outside the vehicle. Accordingly, it is possible to provide a vehicle whose traveling is appropriately suppressed in a case where electric power is supplied from an electric power supply mounted on the vehicle to an electrical device disposed outside the vehicle.

The electronic control unit may be configured to accept the selection indication in a case where the traveling of the vehicle is in the suppressed state.

In this case, the selection indication is accepted in a case where the traveling of the vehicle is in the suppressed state. Accordingly, a state where the vehicle is stopped can be maintained when the external supply mode is selected.

The electronic control unit may be configured to suppress the traveling of the vehicle in a case where the electronic control unit receives the selection indication. In this case, the traveling of the vehicle is suppressed in a case where the selection indication is received. Accordingly, a state where the vehicle is stopped can be maintained when the external supply mode is selected.

The vehicle may further comprise a notification device. The notification device is configured to notify the user of predetermined information. The electronic control unit may be configured to notify the user, by the notification device, of information for prompting the selection of the external supply mode when the electric power can be supplied from the electric power supply to the electrical device.

In this case, the user is notified of the information for prompting the selection of the external supply mode by using the notification device in a case where the supply of the electric power from the electric power supply to the electrical device is allowed. Accordingly, the user can recognize the necessity of the selection of the external supply mode.

The electronic control unit may be configured to notify the user, by using the notification device, of the information for prompting the selection of the external supply mode when the following conditions i) and ii) are satisfied: i) the external supply mode is not selected; ii) an electric power supply mode is a mode in which the electrical device disposed outside the vehicle is estimated as a device that receives electric power from the electric power supply.

In this case, the user is notified of the information for prompting the selection of the external supply mode by using the notification device in the case when the external supply mode is not selected, an electric power supply mode is a mode in which the electrical device disposed outside the vehicle is estimated as a device that receives electric power from the electric power supply. Accordingly, the user can recognize the necessity of the selection of the external supply mode.

The electronic control unit may be configured to control the vehicle to be in a state of being capable of traveling when an internal supply mode is selected. The internal supply mode may be a mode corresponding to a case where the position of the electrical device is inside the vehicle. The electrical device may be configured to receive the supply of the electric power from the electric power supply via the socket.

In this case, the electrical device can be used during the traveling of the vehicle since the internal supply mode is selected.

A control method related to the present invention is for a vehicle. A predetermined mode of the vehicle can be selected by a user. The vehicle includes an electric power supply, a socket, an input device, and an electronic control unit. The socket is connected to the electric power supply. The socket is configured to be connectable to a plug of an electrical device other than a device disposed in the vehicle. The electrical device is configured to receive electric power from the electric power supply via the socket. The control method comprising: receiving, by the input device, a selection indication from the user, the selection indication is an indication for selecting an external supply mode corresponding to a case where a position of the electrical device is outside the vehicle; and controlling the vehicle by the electronic control unit such that traveling of the vehicle is in a suppressed state when the external supply mode is selected by receiving the selection indication.

In this case, it is possible to provide a vehicle whose traveling is appropriately suppressed in a case where electric power is supplied from an electric power supply mounted on the vehicle to an electrical device disposed outside the vehicle.

BRIEF DESCRIPTION OF THE DRAWINGS

Features, advantages, and technical and industrial significance of exemplary embodiments of the present invention will be described below with reference to the accompanying drawings, in which like numerals denote like elements, and wherein:

FIG. 4 is a diagram for showing an operation of the ECU of the first embodiment;

DETAILED DESCRIPTION OF EMBODIMENTS

Figure 1:
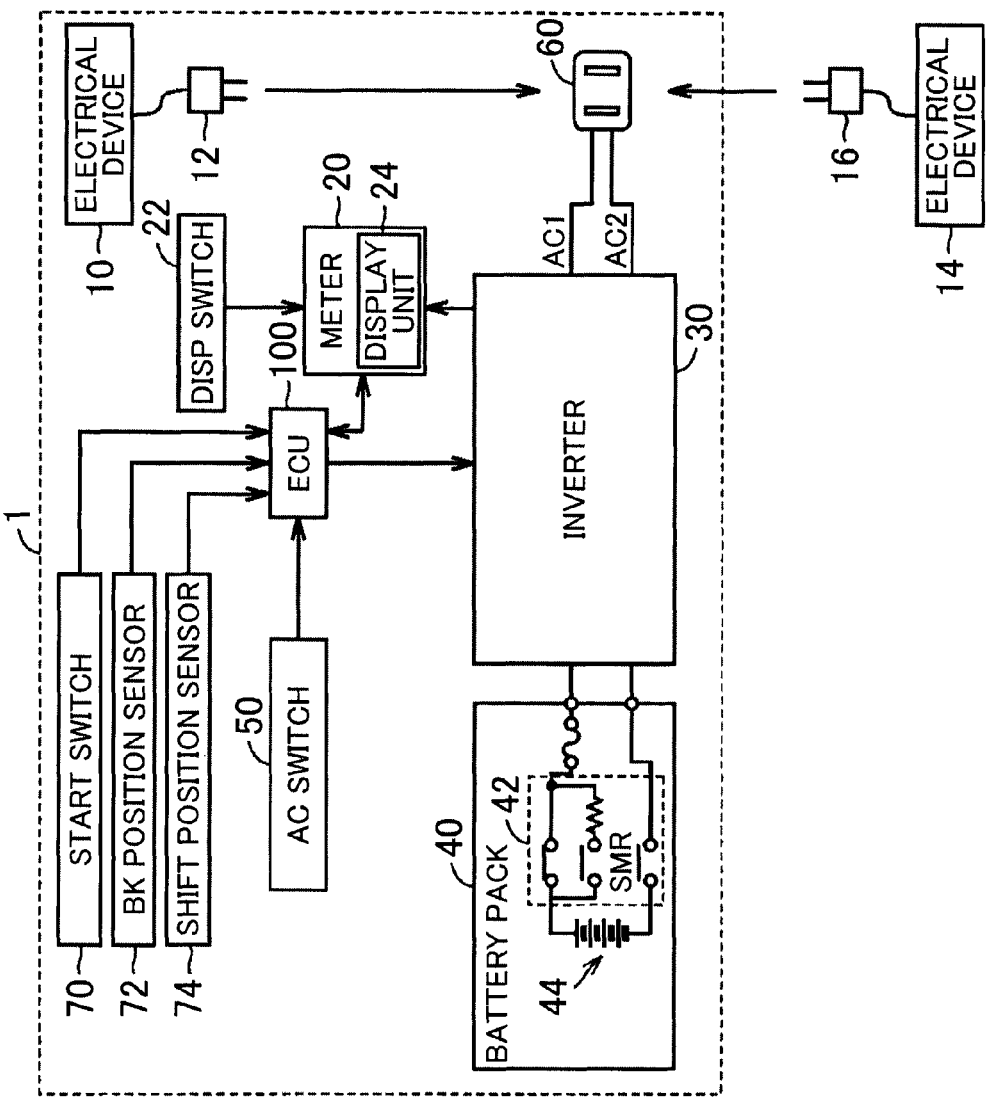
FIG. 1 is a diagram illustrating a schematic configuration of a vehicle.

Hereinafter, embodiments of the present invention will be described with reference to accompanying drawings. In the following description, like reference numerals will be used to refer to like elements sharing the same names and functions. Detailed description thereof will not be repeated.

A first embodiment will be described first. As illustrated in FIG. 1, a vehicle 1 includes an electronic control unit (ECU) 100, a meter 20, a DISP switch 22, a DC-AC inverter, (hereinafter, simply referred to as an inverter) 30, a battery pack 40, an AC switch 50, a socket 60, a start switch 70, a brake pedal position sensor (hereinafter, referred to as a BK position sensor) 72, and a shift position sensor 74.

The vehicle 1, for example, may be a vehicle that is provided with an engine as a driving source, may be an electric vehicle that is provided with an electric motor which is operated when electric power is supplied from a battery 44 as a driving source, or may be a hybrid vehicle that is provided with an engine for driving or electric power generation as well as an electric motor for driving.

The battery pack 40 includes a system main relay (SMR) 42 and the battery 44. The battery pack 40 is connected to the inverter 30 (described later). In a case where, for example, the vehicle 1 is an electric vehicle that is provided with an electric motor for driving, the battery pack 40 is also connected to a power control unit (PCU) that operates the electric motor. Examples of the PCU include a boost converter and a DC-AC inverter.

The battery 44 is an electric power storage device and is a rechargeable DC electric power supply. For example, a secondary battery such as a nickel-hydrogen battery and a lithium-ion battery is used as the battery 44. The battery 44 is an electric power supply source for an electrical device that is disposed in the vehicle 1 and is an electric power supply source for electrical devices 10, 14 (described later) other than the device that is disposed in the vehicle 1. The battery 44 may be charged by using electric power that is supplied from an external electric power supply (not illustrated). The battery 44 is not limited to the secondary battery. The battery 44 may be, for example, a capacitor, a solar cell, or a fuel cell that is capable of generating a DC voltage.

When the SMR 42 is put into an ON state, a state where the electric power of the battery 44 can be output to the outside of the battery pack 40 is achieved. When the SMR 42 is put into an OFF state, a state where the electric power of the battery 44 cannot be output to the outside of the battery pack 40 is achieved. The SMR 42 is switched from one of the ON state and the OFF state to the other one based on a control signal from the ECU 100.

The battery pack 40 is connected to an input unit of the inverter 30. Accordingly, the DC electric power of the battery pack 40 is supplied to the inverter 30. The inverter 30 is an electric power conversion device that converts the DC voltage of the battery pack 40 into an AC voltage having a predetermined voltage (for example, approximately 100 V). The inverter 30 is operated based on the control signal from the ECU 100.

The socket 60 is connected to an output unit of the inverter 30 via electric power supply lines AC1, AC2. A case where the electrical device 10 is brought into and used in a passenger compartment of the vehicle 1 will be described as an example. In a case where a plug 12 of the electrical device 10 is connected to the socket 60, the AC electric power that is converted into the AC voltage by the inverter 30 is supplied to the electrical device 10. As a result, the electrical device 10 can be used in the passenger compartment. In addition, a case where the electrical device 14 outside the vehicle 1 is used will be described. In a case where only a plug 16 is pulled into the passenger compartment from the electrical device 14 and is connected to the socket 60, the AC electric power that is changed into the AC voltage by the inverter 30 is supplied to the electrical device 14. As a result, the electrical device 14 can be used outside the vehicle 1. The electrical devices 10, 14 are, for example, electrical devices for home use.

Both the DISP switch 22 and the AC switch 50 are operation members that are disposed in the passenger compartment. For example, the DISP switch 22 and the AC switch 50 are disposed around a driver's seat.

The AC switch 50 is an operation member that operates the inverter 30. The AC switch 50 is, for example, a momentary-type push button. The AC switch 50 may be a non-momentary-type switch. When the push button is being pressed by a user, a contact point of the AC switch 50 is put into an ON state, and a signal corresponding to the ON state is output to the ECU 100. If the user releases the push button, the push button of the AC switch 50 returns to an initial position due to an elastic force of an elastic member such as a spring, and the contact point is put into an OFF state. Then, a signal corresponding to the OFF state is output to the ECU 100 or the output of the signal corresponding to the ON state is stopped.

The DISP switch 22 is an operation member that performs an operation of a selection menu which is displayed in a display unit 24 of the meter 20. The DISP switch 22 includes, for example, a plurality of direction keys and a decision key. The DISP switch 22 outputs a signal corresponding to the operated key to the meter 20.

The meter 20 includes the display unit 24 that displays states of the vehicle 1 and the above-described selection menu on a screen. The states of the vehicle 1 include, for example, the speed of the vehicle 1, electric power storage state of the battery 44 (for example, state of charge (SOC)), output of the vehicle 1, traveling distance, fuel consumption, maximum traveling distance, charging state of the battery 44, discharging state of the battery 44, and state of the supply of electric power through the socket 60. In a case where an engine is mounted, at least any one of engine rotation speed, fuel accumulation amount, coolant temperature, and the like is included in the states of the vehicle 1 in addition to the states described above.

The meter 20 communicates with the ECU 100 through a communication bus (not illustrated) based on a controller area network (CAN) or the like. For example, the meter 20 displays the selection menu in the display unit 24 based on the control signal from the ECU 100. In a case where, for example, a plurality of display images corresponding to a plurality of choices are displayed in the selection menu in the display unit 24, the meter 20 changes one of the plurality of display images that is a selection target in accordance with the signal from the DISP switch 22 (for example, signal corresponding to the direction key). The meter 20 transmits, to the ECU 100, a signal (selection indication signal) that shows a choice corresponding to the display image that is the selection target based on the signal from the DISP switch 22 (for example, signal corresponding to the decision key). The ECU 100 controls the vehicle 1 based on the selection indication signal from the meter 20.

The socket 60 is disposed in the passenger compartment. A plurality of holes are formed in the socket 60. The plurality of holes of the socket 60 correspond in shape to a plurality of pins that are formed in the plugs 12, 16 at tips of electric power supply cables of the electrical devices 10, 14. The plurality of holes are formed to allow the respective pins to be inserted thereinto. Contact points are embedded in the plurality of holes of the socket 60 and are in an electrically connected state by being in contact with the pins of the plugs. A plurality of the sockets 60 may be disposed in the passenger compartment.

The start switch 70 is an operation member that is operated when the user starts or stops a system of the vehicle 1. The start switch 70 is, for example, a push-type switch. The start switch 70 may be a switch that is operated by inserting a key into a key cylinder and rotating the key to a predetermined position instead of the push-type switch. The start switch 70 is connected to the ECU 100. The start switch 70 transmits an operation signal to the ECU 100 in response to the user's operation of the start switch 70.

The BK position sensor 72 is disposed in a brake pedal (not illustrated) that is disposed in the driver's seat. The BK position sensor 72 detects the depression amount of the brake pedal. The BK position sensor 72 transmits, to the ECU 100, a signal that shows the depression amount of the brake pedal that is detected. A pedal effort sensor that detects the user's pedal effort on the brake pedal may be used instead of the BK position sensor 72.

The shift position sensor 74 detects a position of a shift lever (not illustrated) that is disposed in the driver's seat. The shift position sensor 74 transmits, to the ECU 100, a signal that shows the position of the shift lever. The ECU 100 determines which one of a plurality of shift positions is selected based on the signal that is received from the shift position sensor 74. The plurality of shift positions include, for example, a parking position (referred to as a P position in the following description), a forward traveling position, a reverse traveling position, and a neutral position.

The ECU 100 controls a driving force of the vehicle 1 during the traveling of the vehicle 1 by controlling an output of the driving source (for example, electric motor and engine) of the vehicle 1, controls the SOC of the battery 44 to be within a predetermined range during the operation of the vehicle 1, or controls the inverter 30 while the vehicle 1 is traveling or is stopped so that electric power is supplied to the electrical device that is connected to the socket 60.

In the vehicle 1 that has the configuration described above, it is desirable that the traveling of the vehicle 1 is suppressed when the plug 16 of the electrical device 14 outside the vehicle is connected to the socket 60 in the passenger compartment and the electric power is supplied to the electrical device 14 outside the vehicle. For example, it is considerable that the traveling of the vehicle 1 is suppressed in a case where it is detected that the electric power supply cable of the electrical device that is disposed outside the vehicle 1 is pinched by a door of the vehicle 1. However, this requires an additional detection device that detects the electric power supply cable pinched by the door. In addition, it may be impossible to appropriately suppress the traveling of the vehicle 1 in a case where a window and the door of the vehicle 1 are open and the electric power supply cable is allowed to pass therethrough.

In this embodiment, the AC switch 50 receives a selection indication for selecting an external supply mode. The external supply mode is a mode corresponding to a case where a position of the electrical device, which receives the supply of electric power through the socket 60 from the battery 44 that is an electric power supply, is outside the vehicle 1. In addition, the ECU 100 may control the vehicle 1 so that the traveling of the vehicle 1 is in a suppressed state when the external supply mode is selected by accepting the selection indication in a case where the traveling of the vehicle 1 is in a suppressed state.

In this case, the traveling of the vehicle 1 is in the suppressed state when the external supply mode is selected. Accordingly, a state where the vehicle 1 is stopped can be maintained in a case where the position of the electrical device that receives the supply of electric power from the battery 44 is outside the vehicle.

In addition, the ECU 100 notifies the user of information for prompting the selection of the external supply mode in a case where the supply of electric power from the battery 44 to the electrical device that is connected to the socket 60 is allowed. The notification may be performed by using a notification device that notifies the user of predetermined information. The notification device may notify the user of predetermined information and may be, for example, the display unit 24 of the meter 20, a sound generating device or the like, or a display device other than the display unit 24.

In addition, the ECU 100 notifies the user of information for prompting the selection of the external supply mode in the case when the external supply mode is not selected, an electric power supply mode is a mode in which the electrical device disposed outside the vehicle 1 is estimated as a device that receives electric power from the electric power supply. The electric power supply mode described herein is, for example, a supply mode in which the inverter 30 is operated for at least a predetermined period of time in a state where the shift position is the P position.

When an internal supply mode is selected, the ECU 100 controls the vehicle 1 for the vehicle 1 to be in a state of being capable of traveling. The internal supply mode is a mode corresponding to a case where the position of the electrical device, which receives the supply of electric power through the socket 60 from the battery 44, is inside the vehicle 1.

Figure 2:
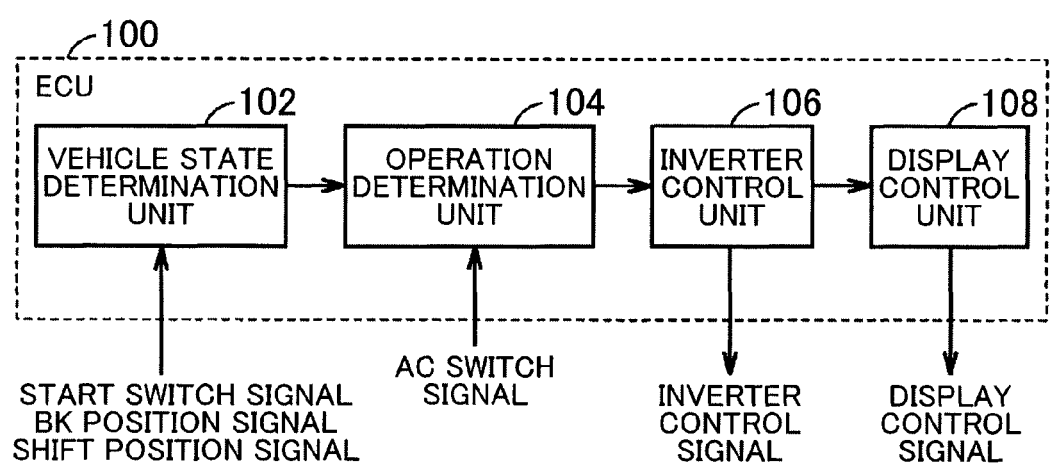
FIG. 2 is a functional block diagram of an ECU of a first embodiment.

FIG. 2 is a functional block diagram of the ECU 100 that is mounted on the vehicle 1 according to this embodiment. The ECU 100 includes a vehicle state determination unit 102, an operation determination unit 104, an inverter control unit 106, and a display control unit 108. These configurations may be realized by software such as programs or may be realized by hardware.

The vehicle state determination unit 102 determines whether or not the vehicle 1 is in an IG ON state, whether or not the vehicle 1 is in a ready-on state (state of being capable of traveling), and whether or not the shift position is the P position.

The "IG ON state" refers to a state where the operation of a plurality of electrical devices that constitute the vehicle 1 but are not associated with the traveling (for example, audio, navigation system, and air-conditioning system) is allowed and the operation of the electrical devices that are associated with the traveling (for example, PCU) is not allowed. In a case where, for example, the start switch 70 is operated in a state where the user releases the depression of the brake pedal, the vehicle 1 is put into the IG ON state. In a case where the vehicle 1 is put into the IG ON state, an IG ON flag is put into an ON state. The vehicle state determination unit 102 determines whether or not the vehicle 1 is in the IG ON state based on, for example, the state of the IG ON flag.

The "ready-on state" refers to a state where each of the plurality of electrical devices that constitute the vehicle 1 can be operated. In a case where, for example, the start switch 70 is operated in a state where the user depresses the brake pedal, the vehicle 1 is put into the ready-on state. In a case where the vehicle 1 is put into the ready-on state, a ready-on flag is put into an ON state. The vehicle state determination unit 102 determines whether or not the vehicle 1 is in the ready-on state based on, for example, the state of the ready-on flag.

In addition, the vehicle state determination unit 102 determines whether or not the shift position is the P position based on a shift signal from the shift position sensor 74. The vehicle state determination unit 102 may determine that the shift position is the P position in a case where, for example, the position of the shift lever is a position corresponding to the P position. Alternatively, the vehicle state determination unit 102 may determine that the shift position is the P position in the case of no history of shift lever operation after the user's operation of the start switch 70 during system OFF (that is, case where the shift position is the P position).

The operation determination unit 104 determines, based on an AC switch signal, whether or not an operation mode of the AC switch 50 is a first operation mode, whether or not the operation mode of the AC switch 50 is a second operation mode, and whether or not the operation mode of the AC switch 50 is a third operation mode.

The first operation mode is, for example, the mode of an ON operation in which the AC switch 50 is pressed once. The second operation mode is, for example, the mode of an ON operation in which the AC switch 50 is pressed twice within a predetermined period of time. The third operation mode is the mode of an OFF operation performed on the AC switch 50 during the operation of the inverter 30. The mode of the OFF operation may, for example, be an operation mode in which the AC switch 50 is pressed once or may be an operation mode in which the AC switch 50 is pressed over a predetermined length of time.

The inverter control unit 106 generates an inverter control signal for controlling the inverter 30 based on results of the determination by the vehicle state determination unit 102 and the operation determination unit 104 and transmits the generated inverter control signal to the inverter 30.

Specifically, the inverter control unit 106 operates the inverter 30 in the internal supply mode in a case where, for example, the vehicle 1 is in the ready-on state and the AC switch 50 is operated in the first operation mode.

The inverter control unit 106 operates the inverter 30 in the external supply mode in a case where, for example, the vehicle 1 is in the IG ON state, the shift position is the P position, and the AC switch 50 is operated in the second operation mode.

The inverter control unit 106 stops the inverter 30 in a case where the AC switch 50 is operated in the third operation mode during the operation of the inverter 30. In addition, the inverter control unit 106 stops the inverter 30 when the start switch 70 is operated and the system of the vehicle 1 is put into a shut-off state. In addition, the inverter control unit 106 stops the inverter 30 in a case where the inverter 30 is operated in the external supply mode and the shift position is switched to a position other than the P position.

In a case where information is displayed in the display unit 24 of the meter 20, the display control unit 108 generates a display control signal and transmits the display control signal to the meter 20. The display control unit 108 performs guide display for prompting the selection of the external supply mode in the display unit 24 of the meter 20 in a case where, for example, a predetermined period of time elapses in a state where the shift position is the P position in the internal supply mode.

Control processing that is executed by the ECU 100 which is mounted on the vehicle 1 according to this embodiment will be described with reference to FIG. 3.

In Step (hereinafter, Step will be referred to as S) 10, the ECU 100 determines whether or not the vehicle 1 is in the IG ON state. In a case where it is determined that the vehicle 1 is in the IG ON state (YES in S10), the processing proceeds to S12. In a case where it is determined that the vehicle 1 is not in the IG ON state (NO in S10), the processing proceeds to S22.

In S12, the ECU 100 determines whether or not the shift position is the P position. In a case where it is determined that the shift position is the P position (YES in S12), the processing proceeds to S14. In a case where it is determined that the shift position is not the P position (NO in S12), the processing returns to S10.

In S14, the ECU 100 determines whether or not the pressing operation (operation in the second operation mode) is performed twice on the AC switch 50. In a case where it is determined that the pressing operation is performed twice on the AC switch 50 (YES in S14), the processing proceeds to S16. In a case where it is determined that the pressing operation is not performed twice on the AC switch 50 (NO in S14), the processing returns to S10.

In S16, the ECU 100 operates the inverter 30 in the external supply mode. The operation of the inverter 30 allows the AC electric power having a predetermined voltage (for example, 100 V) to be supplied to the electrical device that is connected to the socket 60. Since the vehicle 1 is in the IG ON state, the traveling of the vehicle 1 is suppressed in a case where the inverter 30 is in operation in the external supply mode.

In S18, the ECU 100 determines whether or not a termination condition is satisfied. In this embodiment, the termination condition includes at least any one of a condition in which the OFF operation (operation in the third operation mode) is performed on the AC switch 50, a condition in which a shift position other than the P position is selected, and a condition in which an operation for shutting off the system of the vehicle 1 is performed on the start switch 70. In a case where it is determined that the termination condition is satisfied (YES in S18), the ECU 100 allows the processing to proceed to S20. In a case where it is determined that the termination condition is not satisfied (NO in S18), the processing returns to S18. In S20, the ECU 100 stops the inverter 30.

In S22, the ECU 100 determines whether or not the vehicle 1 is in the ready-on state. In a case where it is determined that the vehicle 1 is in the ready-on state (YES in S22), the processing proceeds to S24. In a case where it is determined that the vehicle 1 is not in the ready-on state (NO in S22), the processing returns to S10.

In S24, the ECU 100 determines whether or not the pressing operation (operation in the first operation mode) is performed on the AC switch 50. In a case where it is determined that the pressing operation is performed on the AC switch 50 (YES in S24), the processing proceeds to S26. In a case where it is determined that the pressing operation is not performed on the AC switch 50 (NO in S24), the processing returns to S10.

In S26, the ECU 100 operates the inverter 30 in the internal supply mode. Since the vehicle 1 is in the ready-on state, the vehicle 1 is allowed to travel in a case where the inverter 30 is in operation in the internal supply mode.

In S28, the ECU 100 determines whether or not a P position release history is present. In a case where, for example, a period in which the shift position is switched to a position other than the P position after the vehicle 1 is put into the ready-on state is present, the ECU 100 determines that the P position release history is present. In a case where it is determined that the P position release history is present (YES in S28), the processing proceeds to S30. In a case where it is determined that the P position release history is absent (NO in S28), the processing proceeds to S32.

In S30, the ECU 100 determines whether or not the OFF operation is performed on the AC switch 50. In a case where it is determined that the OFF operation is performed on the AC switch 50 (YES in S30), the processing proceeds to S20. In a case where it is determined that the OFF operation is not performed on the AC switch 50 (NO in S30), the processing proceeds to S28.

In S32, the ECU 100 determines whether or not a predetermined period of time has elapsed since the operation of the inverter 30 is initiated or the guide display for prompting the selection of the external supply mode is performed. In a case where it is determined that the predetermined period of time has elapsed (YES in S32), the processing proceeds to S34. In a case where it is determined that the predetermined period of time has not elapsed (NO in S32), the processing proceeds to S28. In S34, the ECU 100 performs the guide display for prompting the selection of the external supply mode on the display unit 24 of the meter 20. For example, the ECU 100 displays, in the display unit 24, text information such as "Please use in external supply mode by pressing AC switch twice in IG ON state to continue using in vehicle stop state".

An operation of the ECU 100 that is mounted on the vehicle 1 according to this embodiment will be described with reference to FIG. 4 and based on the above-described configuration and flowchart.

As illustrated in (A) of FIG. 4, a case where the system of the vehicle 1 is in, for example, an OFF state will be assumed. In this case, the shift position is the P position.

Figure 3A:
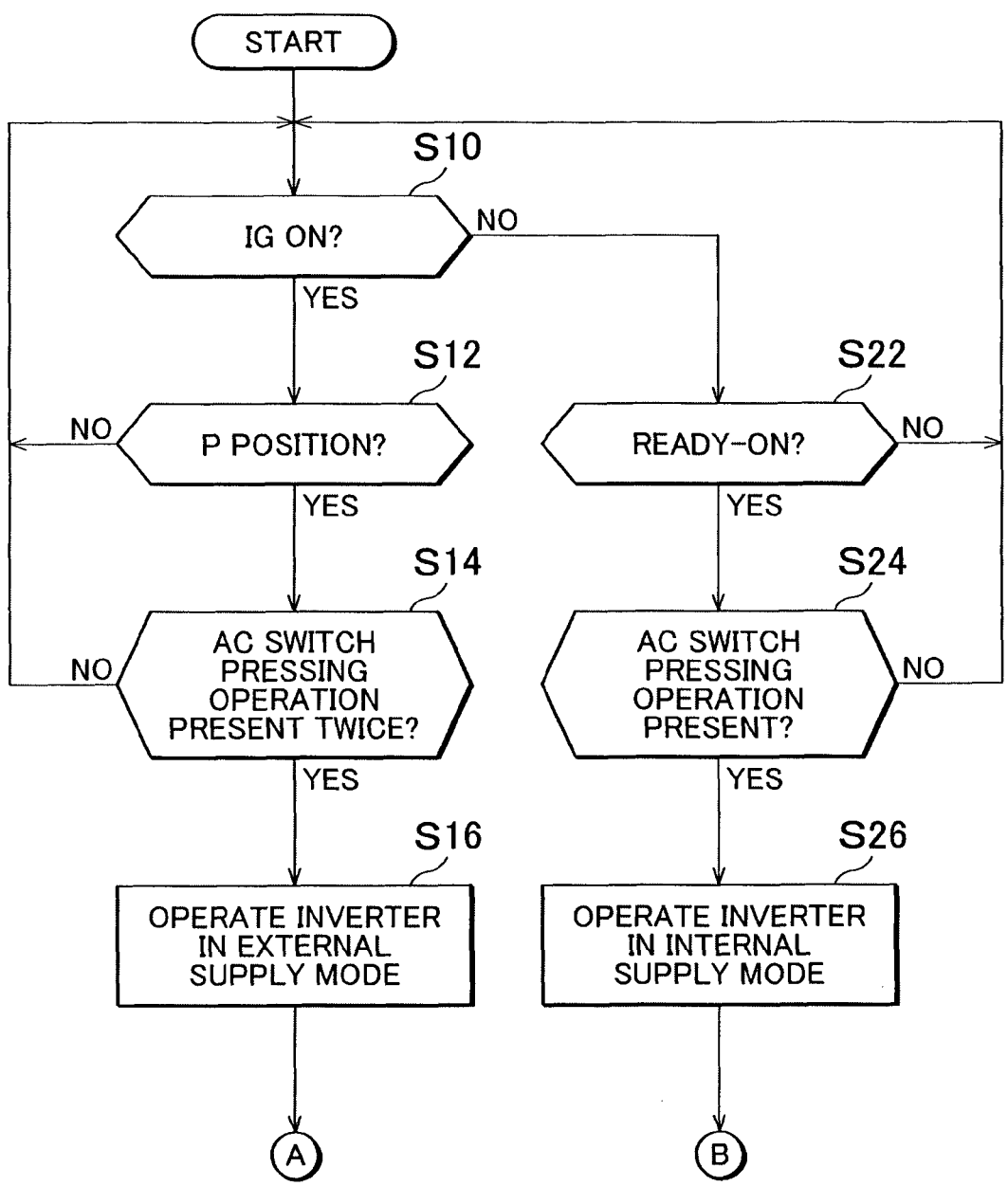
FIG. 3 is a flowchart illustrating control processing that is executed by the ECU of the first embodiment.
Figure 3B:
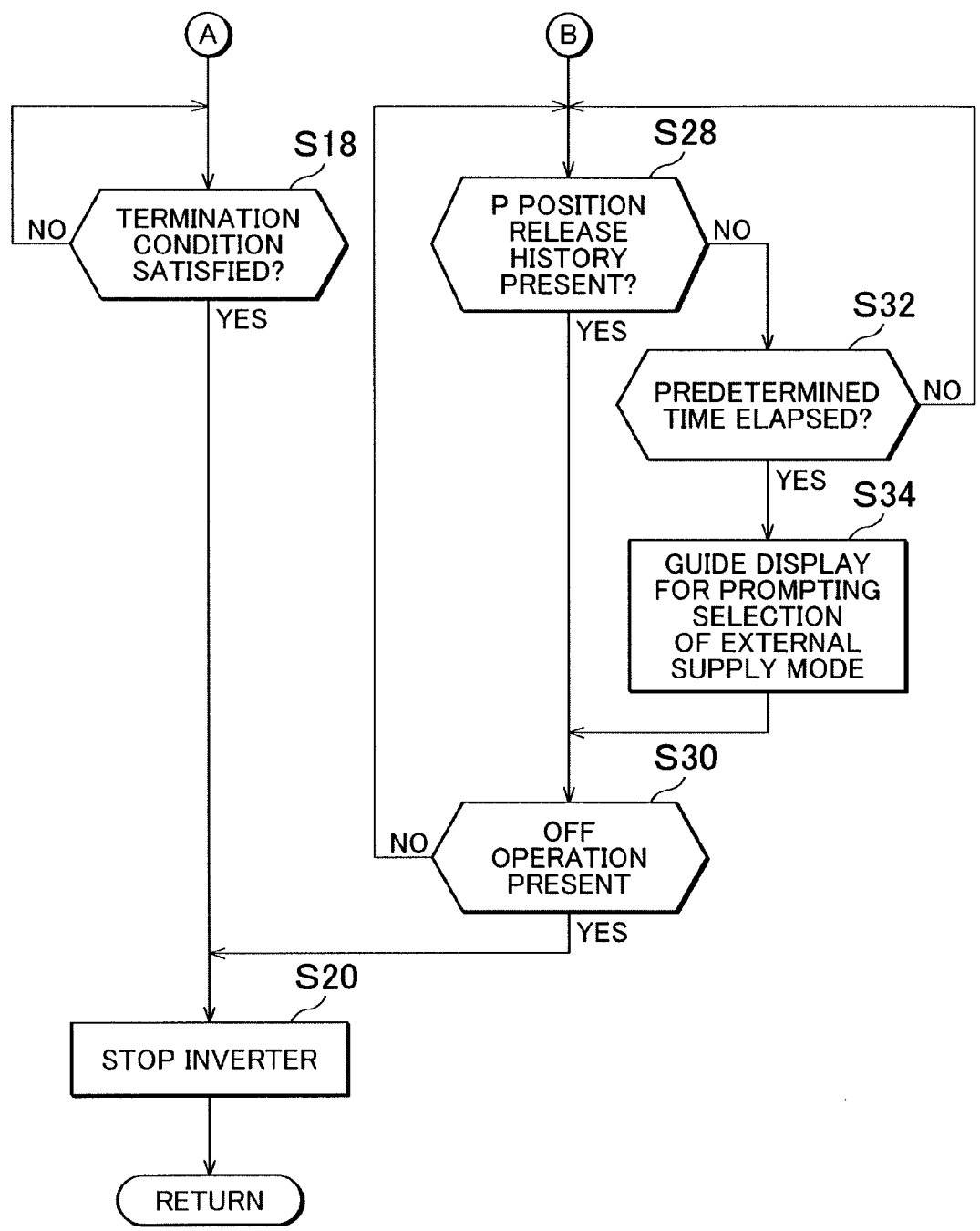

When the start switch 70 is operated in a state where the depression of the brake pedal by the user is released, the vehicle 1 is put into the IG ON state as illustrated in (B) (YES in S10 in FIG. 3). In this case, a state where the operation of the electrical devices associated with the traveling of the vehicle 1 is not allowed is achieved, and thus the traveling of the vehicle 1 is in a suppressed state.

Accordingly, the inverter 30 is operated in the external supply mode (S16) as illustrated in (M) if the user performs the pressing operation twice on the AC switch 50 (YES in S14) as illustrated in (L) in a state where the shift position is the P position (YES in S12) as illustrated in (C). In a case where the inverter 30 is operated in the external supply mode, the operation continues without performing the guide display for prompting the selection of the external supply mode as illustrated in (K). Since the vehicle 1 is in the IG ON state, the traveling of the vehicle 1 is in a suppressed state even during the operation of the inverter 30.

The inverter 30 is stopped (S20) in a case where the termination conditions are satisfied (YES in S18) by, for example, the user performing the OFF operation on the AC switch 50.

In a case where the system of the vehicle 1 is in the OFF state as illustrated in (A), the vehicle 1 is put into the ready-on state (YES in S22) as illustrated in (E) when, for example, the start switch 70 is operated in a state where the user depresses the brake pedal. In this case, the electrical device associated with the traveling of the vehicle 1 is in operation, and thus the vehicle 1 is put into a state of being capable of traveling.

The inverter 30 is operated in the internal supply mode (S26) as illustrated in (G) if the user performs the pressing operation once on the AC switch 50 (YES in S24) as illustrated in (F).

In a case where the inverter 30 is operated in the internal supply mode and, for example, a predetermined period of time elapses (YES in S32) without the release of the P position (NO in S28) after the vehicle 1 is put into the ready-on state as illustrated in (J), the guide display for prompting the selection of the external supply mode is performed (S34) as illustrated in (K).

In a case where the inverter 30 is operated in the internal supply mode and, for example, the P position is released as illustrated in (H), the guide display for prompting the selection of the external supply mode is not performed. The operation of the inverter 30 continues, as illustrated in (I), until the OFF operation is performed (NO in S30).

As described above, the selection indication for the external supply mode is accepted from the user in a case where the traveling of the vehicle 1 is in a suppressed state (IG ON state) in the vehicle according to this embodiment. In other words, the traveling of the vehicle 1 is put into a suppressed state when the external supply mode is selected. Accordingly, a state where the vehicle 1 is stopped can be maintained in a case where the position of the electrical device receiving the supply of electric power from the battery 44 is outside the vehicle 1. Accordingly, it is possible to provide a vehicle whose traveling is appropriately suppressed in a case where electric power is supplied from an electric power supply mounted on the vehicle to an electrical device disposed outside the vehicle.

In addition, the user is notified of the information for prompting the selection of the external supply mode, by using the display unit 24 of the meter 20, in a case where the supply of electric power from the battery 44 to the electrical device connected to the socket 60 is allowed. Accordingly, the user can recognize the necessity of the selection of the external supply mode. This notification is particularly useful in the case when the external supply mode is not selected, an electric power supply mode is a mode in which the electrical device disposed outside the vehicle 1 is estimated as a device that receives electric power from the electric power supply.

In the case of the ready-on state where the vehicle 1 is allowed to travel, the operation of the AC switch 50 allows the inverter 30 to be operated in the internal supply mode. Accordingly, the electrical device 10 in the passenger compartment can be used during the traveling of the vehicle 1.

In this embodiment, it has been described that the guide display is performed whenever the predetermined period of time elapses in a state where the operation of the inverter 30 continues in a case where the inverter 30 is operated in the internal supply mode and the P position release history is absent. In a case where, for example, the inverter 30 is operated in the internal supply mode and the P position release history is absent, the guide display may be performed and the inverter 30 may be stopped after the predetermined period of time elapses.

In this embodiment, it has been described that the traveling of the vehicle 1 is suppressed when the external supply mode is selected. However, when the external supply mode is selected, the traveling of the vehicle 1 may be prohibited by prohibiting the operation of the electrical devices associated with the traveling of the vehicle 1.

Hereinafter, a second embodiment will be described. The second embodiment differs from the first embodiment in that the user can operate the inverter 30 by using the DISP switch 22 while watching the selection menu that is displayed in the display unit 24 of the meter 20. Also, the second embodiment differs from the first embodiment regarding the operation of the ECU 100. The other configurations and operations are identical to those of the above-described first embodiment that is illustrated in FIG. 1. The same reference numerals will be used therefor and detailed description thereof will not be repeated herein.

In this embodiment, the ECU 100 suppresses the traveling of the vehicle 1 in a case where the selection indication for selecting the external supply mode is received by using the DISP switch 22.

Figure 5:
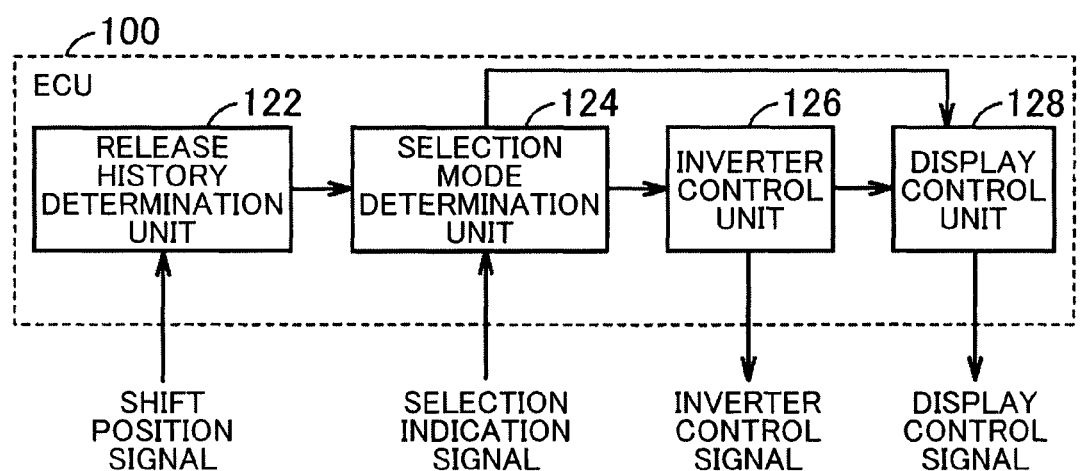
FIG. 5 is a functional block diagram of an ECU of a second embodiment.

FIG. 5 is a functional block diagram of the ECU 100 that is mounted on the vehicle 1 according to this embodiment. The ECU 100 includes a release history determination unit 122, a selection mode determination unit 124, an inverter control unit 126, and a display control unit 128. These configurations may be realized by software such as programs or may be realized by hardware.

The release history determination unit 122 determines whether or not a P position release history is present. Specifically, the release history determination unit 122 determines that the P position release history is present in a case where a period in which the P position is released once or more after the vehicle 1 is put into the ready-on state is present.

The selection mode determination unit 124 determines which one of the external supply mode and the internal supply mode is selected.

In this embodiment, a first display image that shows the external supply mode and a second display image that shows the internal supply mode are displayed as choices in a case where the DISP switch 22 is operated and the selection menu for selecting the operation mode of the inverter 30 is displayed. In a case where any one of the first display image and the second display image is selected by the user operating the DISP switch 22, a selection indication signal that shows the mode corresponding to the selected display image is transmitted from the meter 20 to the ECU 100.

The selection mode determination unit 124 determines which one of the external supply mode and the internal supply mode is selected based on the selection indication signal that is received from the meter 20.

The selection of the display image may be performed by, for example, moving a position of a cursor image so that the cursor image overlaps an image of the selection target. The cursor image may be, for example, an image that surrounds an image in a frame.

The inverter control unit 126 generates an inverter control signal for controlling the inverter 30 based on results of the determination by the release history determination unit 122 and the selection mode determination unit 124 and transmits the generated inverter control signal to the inverter 30.

Specifically, the inverter control unit 126 operates the inverter 30 in the external supply mode in a case where the external supply mode is selected by the user after the vehicle 1 is put into the ready-on state. In a case where the inverter 30 is operated in the external supply mode by the inverter control unit 126, the vehicle 1 is put into a ready-off state (that is, IG ON state). Accordingly, the traveling of the vehicle 1 is suppressed.

In a case where the internal supply mode is selected by the user, the inverter control unit 126 operates the inverter 30 in the internal supply mode. In a case where the inverter 30 is operated in the internal supply mode, the vehicle 1 remains in the ready-on state, and thus the vehicle 1 is allowed to travel. In a case where the inverter 30 is operated in the internal supply mode and the P position release history is absent after the initiation of the operation of the inverter 30, the inverter control unit 126 stops the inverter 30 after a predetermined period of time elapses from the initiation of the operation of the inverter 30.

In a case where the inverter 30 is operated in the internal supply mode and the P position release history is present after the initiation of the operation of the inverter 30, the inverter control unit 126 continues operating the inverter 30 until the OFF operation is performed.

The display control unit 128 generates a display control signal for controlling the display of the meter 20 and transmits the generated display control signal to the meter 20. In a case where the selection menu for selecting the operation mode of the inverter 30 is displayed in the display unit 24, the display control unit 128 displays a display image corresponding to a mode that can be selected in accordance with the state of the vehicle 1 to be selectable.

In a case where, for example, the external supply mode cannot be selected and the internal supply mode can be selected from the external supply mode and the internal supply mode, the display control unit 128 does not display the first display image that corresponds to the external supply mode or displays the first display image not to be selectable and displays the second display image that corresponds to the internal supply mode to be selectable.

Alternatively, the display control unit 128 displays the first display image that corresponds to the external supply mode to be selectable and does not display the second display image that corresponds to the internal supply mode or displays the second display image not to be selectable in a case where, for example, the external supply mode can be selected and the internal supply mode cannot be selected from the external supply mode and the internal supply mode.

In a case where the inverter 30 is operated in the internal supply mode and the P position release history is absent after the initiation of the operation of the inverter 30, the display control unit 128 performs the guide display for prompting the selection of the external supply mode on the display unit 24 when the inverter 30 is stopped after a predetermined period of time elapses from the initiation of the operation of the inverter 30. In a case where the inverter 30 is operated in the internal supply mode and the P position release history is present after the initiation of the operation of the inverter 30, the display control unit 128 does not perform the guide display.

Figure 6A:
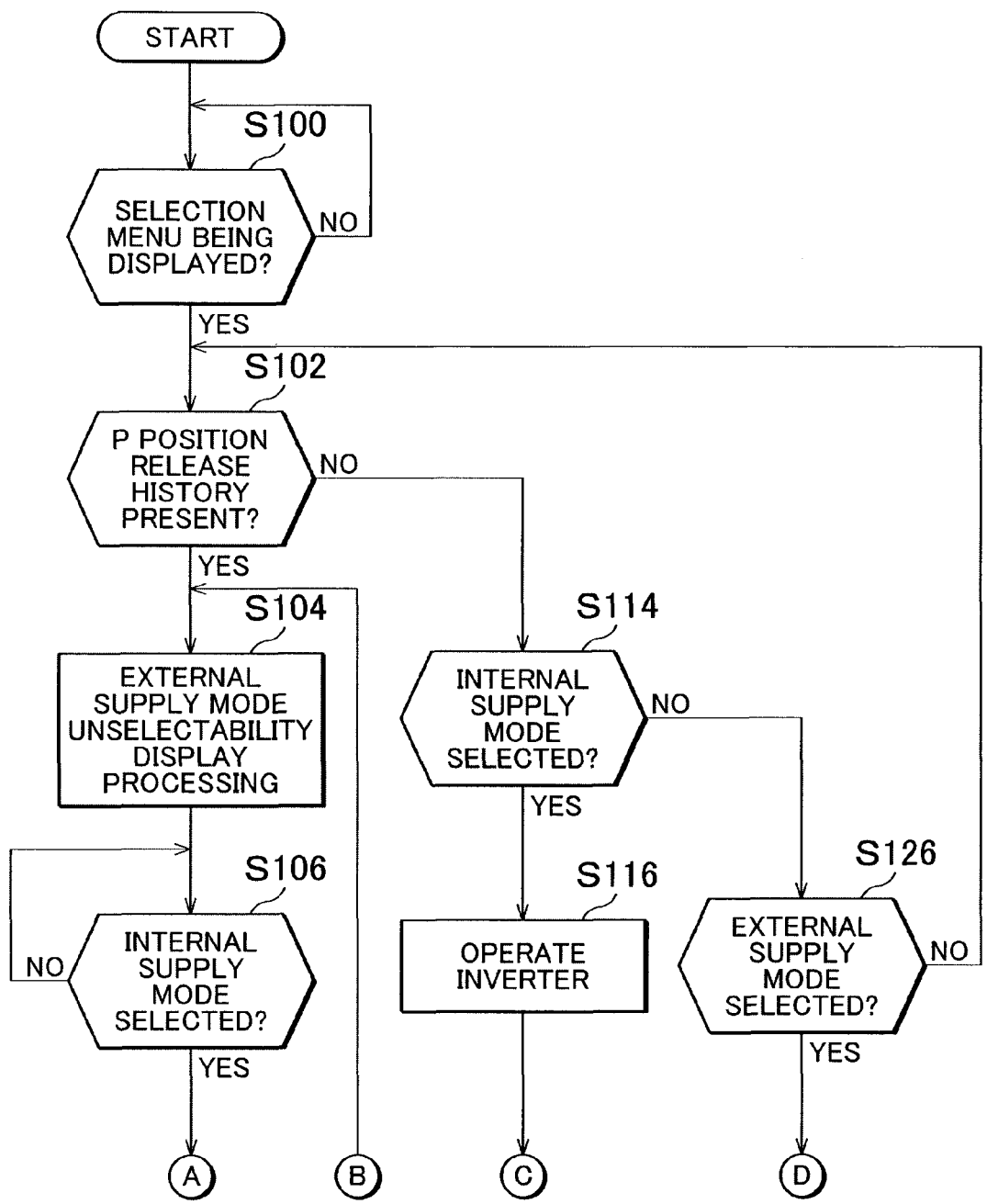
FIG. 6 is a flowchart illustrating control processing that is executed by the ECU of the second embodiment.
Figure 6B:
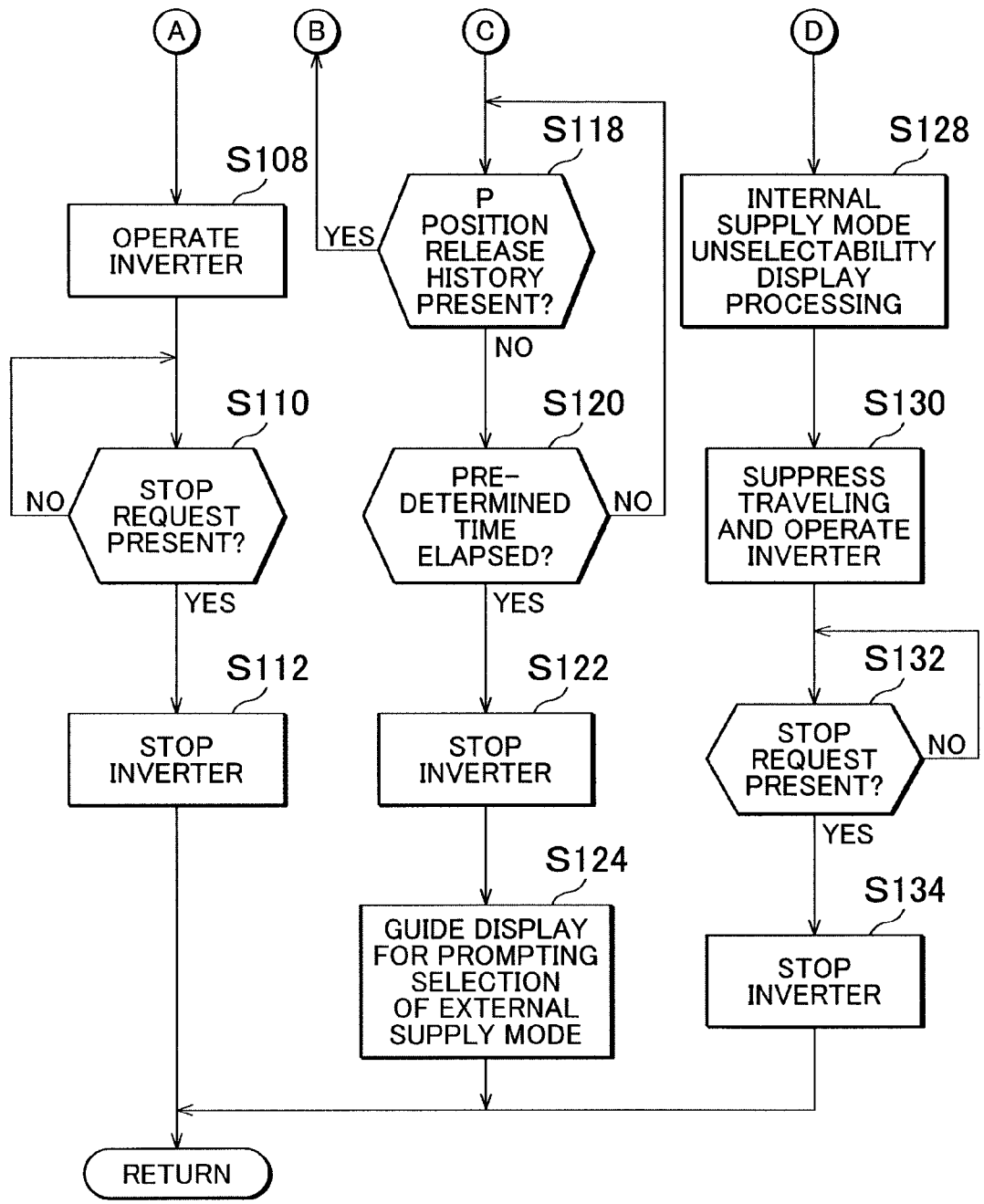

Control processing that is executed by the ECU which is mounted on the vehicle 1 according to this embodiment will be described with reference to FIG. 6.

In Step 100, the ECU 100 determines whether or not the selection menu is being displayed. As described above, the selection menu is displayed by the DISP switch 22 being operated in a case where the vehicle 1 is in the ready-on state and the display of the selection menu for the user's selection of the operation mode of the inverter 30 being indicated. The ECU 100 may determine whether or not the selection menu is displayed based on, for example, the state of a flag that is in an ON state during the display of the selection menu. In a case where it is determined that the selection menu is displayed (YES in S100), the processing proceeds to S102. In a case where it is determined that the selection menu is not displayed (NO in S100), the processing returns to S100.

In S102, the ECU 100 determines whether or not the P position release history is present. In a case where it is determined that the P position release history is present (YES in S102), the processing proceeds to S104. In a case where it is determined that the P position release history is absent (NO in S102), the processing proceeds to S114.

In S104, the ECU 100 executes unselectability display processing so that the external supply mode cannot be selected. Specifically, the ECU 100 does not display the display image corresponding to the external supply mode or prevents the display image corresponding to the external supply mode from being selected by the operation of the DISP switch 22 by, for example, limiting the movement of the cursor image.

In S106, the ECU 100 determines whether or not the internal supply mode is selected. In a case where it is determined that the internal supply mode is selected (YES in S106), the processing proceeds to S108. In a case where it is determined that the internal supply mode is not selected (NO in S106), the processing returns to S106.

In S108, the ECU 100 operates the inverter 30 in the internal supply mode. Since the vehicle 1 is in the ready-on state, the traveling of the vehicle 1 is allowed in a case where the inverter 30 is operated in the internal supply mode.

In S110, the ECU 100 determines whether or not a request for stopping the inverter 30 is present. The ECU 100 may determine that the request for stopping the inverter 30 is present in a case where, for example, the user performs an operation for re-selecting the display image on the selection menu that shows the internal supply mode. Alternatively, the ECU 100 may determine that the request for stopping the inverter 30 is present in a case where the user performs an operation for selecting the display image on the selection menu that shows a stop request. In a case where it is determined that the request for stopping the inverter 30 is present (YES in S110), the processing proceeds to S112. In a case where it is determined that the request for stopping the inverter 30 is absent (NO in S110), the processing returns to S110. In S112, the ECU 100 stops the inverter 30.

In S114, the ECU 100 determines whether or not the internal supply mode is selected. In a case where the internal supply mode is selected (YES in S114), the processing proceeds to S116. In a case where the internal supply mode is not selected (NO in S114), the processing proceeds to S126.

In S116, the ECU 100 operates the inverter 30 in the internal supply mode. In S118, the ECU 100 determines whether or not the P position release history is present. In a case where it is determined that the P position release history is present (YES in S118), the processing proceeds to S104. In a case where it is determined that the P position release history is absent (NO in S118), the processing proceeds to S120.

In S120, the ECU 100 determines whether or not a predetermined period of time has elapsed since the operation of the inverter 30. The predetermined period of time is, for example, the time during which it can be estimated that electric power may be supplied to the electrical device outside the vehicle 1, and is not particularly limited. In a case where the predetermined period of time has elapsed since the operation of the inverter 30 (YES in S120), the processing proceeds to S122. In a case where the predetermined period of time has not elapsed since the operation of the inverter 30 (NO in S120), the processing returns to S118.

In S122, the ECU 100 stops the inverter 30. In S124, the ECU 100 performs the guide display for prompting the selection of the external supply mode on the display unit 24 of the meter 20.

In S126, the ECU 100 determines whether or not the external supply mode is selected. In a case where the external supply mode is selected (YES in S126), the processing proceeds to S128. In a case where the external supply mode is not selected (NO in S126), the processing returns to S102.

In S128, the ECU 100 executes unselectability display processing so that the internal supply mode cannot be selected. Specifically, the ECU 100 does not display the display image corresponding to the internal supply mode or prevents the display image corresponding to the internal supply mode from being selected by the operation of the DISP switch 22 by, for example, limiting the movement of the cursor image.

In S130, the ECU 100 suppresses the traveling of the vehicle 1 and operates the inverter 30 in the external supply mode. Specifically, the ECU 100 suppresses the traveling of the vehicle 1 during the operation of the inverter 30 by putting the vehicle 1 into the ready-off state (IG ON state).

In S132, the ECU 100 determines whether or not the request for stopping the inverter 30 is present. In a case where it is determined that the request for stopping the inverter 30 is present (YES in S132), the processing proceeds to S134. In a case where it is determined that the request for stopping the inverter 30 is absent (NO in S132), the processing returns to S132.

An operation of the ECU 100 that is mounted on the vehicle 1 according to this embodiment will be described with reference to FIG. 7 and based on the above-described configuration and flowchart.

Figure 7:
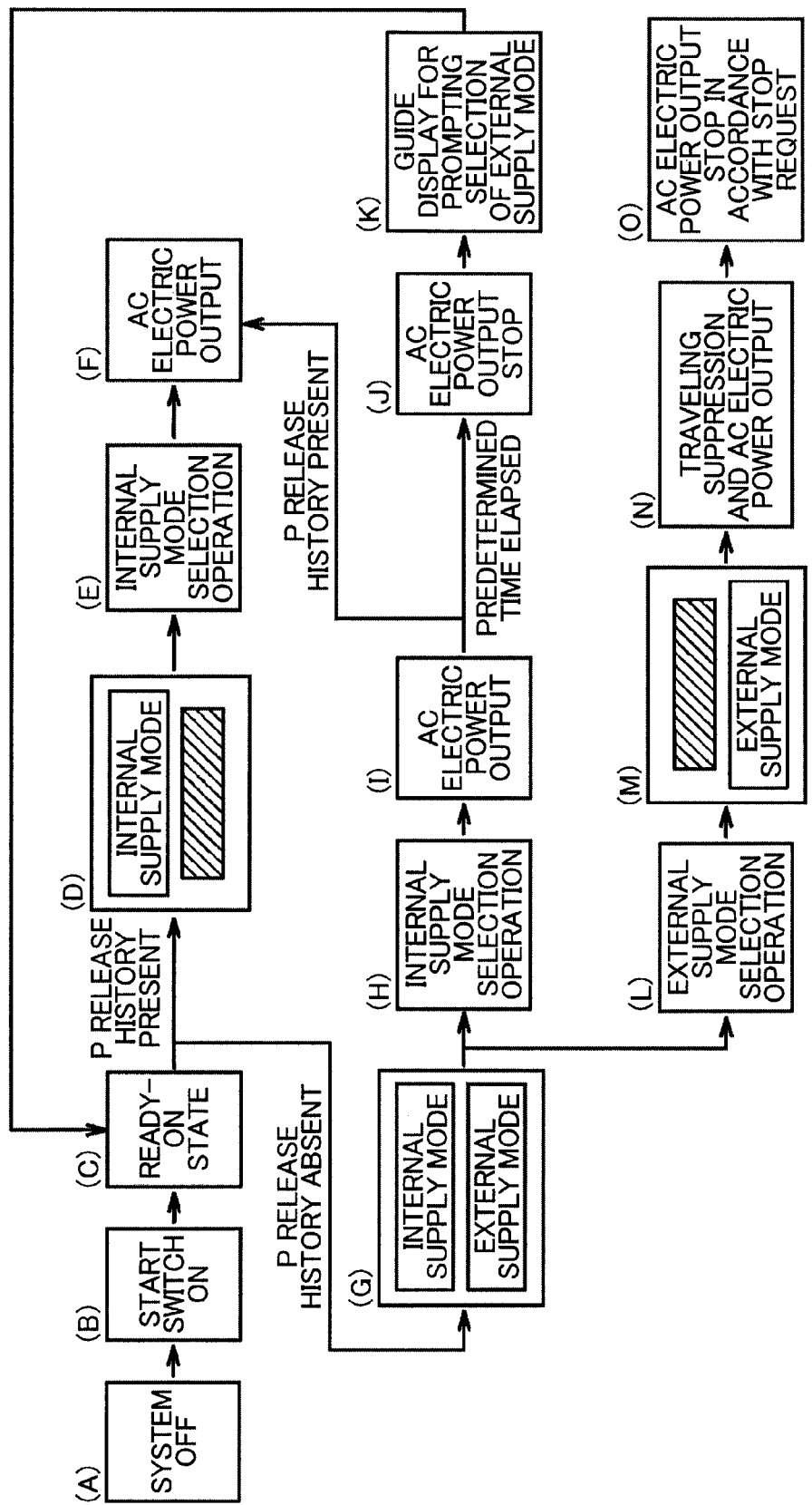
FIG. 7 is a diagram for showing an operation of the ECU of the second embodiment.

As illustrated in (A) of FIG. 7, a case where the system of the vehicle 1 is in, for example, an OFF state will be assumed. When the start switch 70 is operated in a state where the user depresses the brake pedal as illustrated in (B), the vehicle 1 is put into the ready-on state as illustrated in (C). In this case, the user operates the DISP switch 22 and the selection menu for selecting a control mode of the inverter 30 is displayed (YES in S100).

In a case where the P position release history is present after the vehicle 1 is put into the ready-on state (YES in S102), the display image that corresponds to the external supply mode is not displayed (shaded frame in (D)) in the selection menu as illustrated in (D) (S104).

Then, the inverter 30 is operated in the internal supply mode as illustrated in (F) and the AC electric power having a predetermined voltage is output (S108) in a case where the display image that corresponds to the internal supply mode is selected on the menu screen as illustrated in (E) (YES in S106).

In a case where the P position release history is absent (NO in S102), both the display image that corresponds to the external supply mode and the display image that corresponds to the internal supply mode are displayed to be selectable in the menu screen as illustrated in (G).

Then, the inverter 30 is operated in the internal supply mode as illustrated in (I) and the AC electric power having a predetermined voltage is output (S116) in a case where the display image that corresponds to the internal supply mode is selected in the menu as illustrated in (H) (YES in S114).

In a case where the operation of the inverter 30 is initiated and a predetermined period of time elapses (YES in S120) with the P position release history being absent (YES in S118), the inverter 30 is stopped and the output of the AC electric power is stopped as illustrated in (J) (S122). Then, the guide display for prompting the selection of the external supply mode is performed as illustrated in (K) (S124).

In a case where the display image that corresponds to the external supply mode is selected in the selection menu as illustrated in (L) (YES in S126), the display image that corresponds to the internal supply mode is not displayed (shaded frame in (M)) in the selection menu as illustrated in (M) (S128). Then, the traveling of the vehicle 1 is suppressed with the vehicle 1 put into the ready-off state as illustrated in (N), the inverter 30 is operated in the external supply mode, and the AC electric power having a predetermined voltage is output (S130).

As illustrated in (O), the inverter 30 is stopped in response to the stop request of the user (YES in S132), and the output of the AC electric power is stopped (S134).

In the vehicle according to this embodiment, the traveling of the vehicle 1 is suppressed and the external supply mode is selected when the selection indication for the external supply mode is received from the user as described above. Accordingly, a state where the vehicle 1 is stopped can be maintained in a case where the position of the electrical device receiving the supply of electric power from the battery 44 is outside the vehicle 1. Accordingly, it is possible to provide a vehicle whose traveling is appropriately suppressed in a case where electric power is supplied from an electric power supply mounted on the vehicle to an electrical device disposed outside the vehicle.

In this embodiment, it has been described that the inverter 30 is stopped and the guide display for prompting the selection of the external supply mode is performed after a predetermined period of time elapses in a case where the internal supply mode is selected in a state where the P position release history is absent. However, the guide display may be performed with, for example, the operation of the inverter 30 continuing without stopping the inverter 30.

In this embodiment, it has been described that the user can select the operation mode of the inverter 30 by using the DISP switch 22 while watching the selection menu that is displayed in the display unit 24 of the meter 20. However, the operation mode of the inverter 30 may be allowed to be selected, as described in the first embodiment described above, by using the AC switch 50 in addition to the DISP switch 22. Also, the operation mode of the inverter 30 may be allowed to be selected only with the DISP switch 22 with the AC switch 50 omitted.

In this embodiment, the operation mode of the inverter 30 may be allowed to be selected by operating a touch panel instead of the AC switch 50 and the DISP switch 22. The touch panel may be disposed in a display device other than the display unit 24 and the meter 20.

It should be understood that the embodiments disclosed herein are illustrative in every aspect and do not limit the present invention. The scope of the present invention is clarified in the claims, not the description above, and any modification within the claims and equivalents thereof are included in the present invention.

What is claimed is:

1. A vehicle that a predetermined mode of the vehicle can be selected by a user,
the vehicle comprising:
an electric power supply;
a socket connected to the electric power supply, the socket being configured to be connectable to a plug of an electrical device other than a device disposed in the vehicle;
an input device configured to receive, from the user, a selection indication for selecting an external supply mode, the external supply mode being a mode corresponding to a case where a position of the electrical device is outside the vehicle, and the electrical device being configured to receive electric power from the electric power supply via the socket; and
an electronic control unit configured to control the vehicle such that traveling of the vehicle is in a suppressed state when the external supply mode is selected by receiving the selection indication.

2. The vehicle according to claim 1,
wherein the electronic control unit is configured to accept the selection indication in a case where the traveling of the vehicle is in the suppressed state.

3. The vehicle according to claim 1,
wherein the electronic control unit is configured to suppress the traveling of the vehicle in a case where the electronic control unit receives the selection indication.

4. The vehicle according to claim 1, further comprising:
a notification device configured to notify the user of predetermined information,
wherein the electronic control unit is configured to notify the user, by the notification device, of information for prompting the selection of the external supply mode when the electric power can be supplied from the electric power supply to the electrical device.

5. The vehicle according to claim 4,
wherein the electronic control unit is configured to notify the user, by using the notification device, of the information for prompting the selection of the external supply mode when following conditions i) and ii) are satisfied:
i) the external supply mode is not selected; and
ii) an electric power supply mode is a mode in which the electrical device disposed outside the vehicle is estimated as a device that receives electric power from the electric power supply.

6. The vehicle according to claim 1,
wherein the electronic control unit is configured to control the vehicle to be in a state of being capable of traveling when an internal supply mode is selected, the internal supply mode is a mode corresponding to a case where the position of the electrical device is inside the vehicle, and the electrical device is configured to receive the supply of the electric power from the electric power supply via the socket.

7. A control method for a vehicle, a predetermined mode of the vehicle being able to selected by a user, the vehicle including an electric power supply, a socket, an input device, and an electronic control unit, the socket being connected to the electric power supply, the socket being configured to be connectable to a plug of an electrical device other than a device disposed in the vehicle, and the electrical device being configured to receive electric power from the electric power supply via the socket, the control method comprising:

receiving, by the input device, a selection indication from the user, the selection indication being an indication for selecting an external supply mode corresponding to a case where a position of the electrical device is outside the vehicle; and controlling the vehicle by the electronic control unit such that traveling of the vehicle is in a suppressed state when the external supply mode is selected by receiving the selection indication.

* * * * *